United States Patent Office 2,852,375
Patented Sept. 16, 1958

2,852,375

NEW TETRAZAINDENE COMPOUNDS AND PHOTOGRAPHIC EMULSIONS CONTAINING THEM

John F. Tinker, Rochester, N. Y., assignor to Eastman Kodak Company, Rochester, N. Y., a corporation of New Jersey No Drawing. Application September 28, 1956
Serial No. 612,598

11 Claims. (Cl. 96—66)

This invention relates to new tetrazaindene compounds, methods for preparing such compounds, and photographic silver halide emulsions stabilized against the formation of fog by means of such compounds.

It is well known that photographic emulsions on storage tend to lose sensitivity and to become spontaneously developable without exposure to light. There is normally a detectable amount of the silver salt reduced during development in the areas where no exposure was given; this is commonly called "fog," and sometimes called "chemical fog" where it is necessary to distinguish between it and the effects of accidental exposure to radiation; in this invention, I am not concerned with the latter.

Fog depends both on the emulsion and the conditions of development; for a given emulsion it increases with the degree of development. With constant development conditions, it tends to increase with time, temperature and relative humidity of storage conditions; it is common practice to make accelerated tests of the stability of photographic emulsions by storage at increased temperature or humidity, or both. It is, of course, desirable to have emulsions as stable as possible under the conditions of high temperature and humidity which may occur in tropical climates, for example. Fog usually appears over the whole area of the sensitive coating, but when severe, it frequently is non-uniform. Fog may also be caused by exposure to chemicals, for example, hydrogen sulfide and other reactive sulfur compounds, hydrogen peroxide vapor, and strongly reducing materials. While antifoggants and stabilizers may protect, to some extent, against such effects, it is normally understood that an antifoggant protects against spontaneous growth of fog during prolonged storage or storage at high temperatures and humidities, or during development to maximum contrast and speed, or both.

It is, therefore, an object of the present invention to provide a method for stabilizing photographic emulsions. A further object is to provide means for reducing the fog produced upon keeping of such emulsions which have been sensitized, especially emulsions stored under tropical or other adverse conditions. Another object is to provide means for stabilizing the speed and contrast of sensitized photographic emulsions. A still further object is to provide new tetrazaindene compounds and a method for making such compounds. Other objects will become apparent from a consideration of the following description and examples.

According to my invention, I provide a method for stabilizing photographic silver halide emulsions by incorporating therein a bis-heterocyclic compound selected from those represented by the following general formula:

(I) 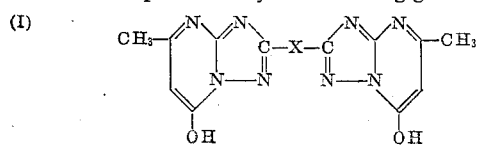

wherein X represents a divalent aliphatic organic group containing at least two carbon atoms, such as ethylene, propylene, tetramethylene, etc., including groups which have substituents thereon, such as chlorine, hydroxyl, carboxyl, etc. The carbon atoms in the alkylene chains mentioned above can be replaced, in part, by other atoms, such as oxygen, nitrogen, etc.

The new compounds represented by Formula I above can advantageously be prepared by first condensing a compound represented by the following formula:

(II) 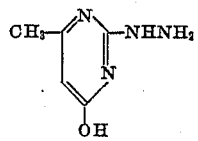

with an ester selected from those represented by the following general formula:

(III) 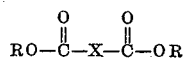

wherein X has the values given above and R represents an alkyl group, such as methyl, ethyl, n-propyl, n-butyl, etc., to provide hydrazide compounds selected from those represented by the following general formula:

(IV) 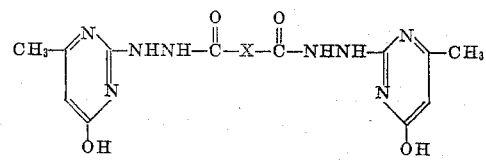

wherein X has the values given above. Upon refluxing the compounds selected from those represented by Formula IV above in a solution containing a strong mineral acid, such as hydrochloric acid, hydrobromic acid, etc., and a solvent, such as glacial acetic acid, the compounds selected from those represented by Formula I above are formed. Generally, a small quantity of 6-methyluracil is formed as a by-product, but this is easily separated from the reaction mixture.

I have further found that the compounds selected from those represented by the following general formula:

(V) 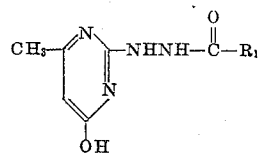

wherein $R_1$ represents a hydrogen atom, an alkyl group, such as methyl, ethyl, β-hydroxyethyl, γ-hydroxypropyl, etc., an aryl group, such as phenyl, etc., or a heterocyclyl group, such as pyridyl, etc., can be treated under mild acid conditions, such as by warming with formic acid, to provide compounds having the following formula:

(VI) 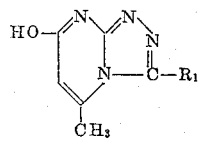

wherein $R_1$ has the values given above. Treatment of the compounds of Formula VI above with a strong acid, such as concentrated hydrochloric acid in the presence of a solvent, such as glacial acetic acid, provides compounds having the following general formula:

(VII) 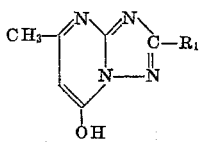

wherein $R_1$ has the values given above. Alternatively, the compounds represented by Formula V above wherein $R_1$ represents a hydrogen atom or an alkyl group (but not an aryl group or a heterocyclyl group) can be treated under strongly acid conditions to provide the compounds represented by Formula VII in a single step. Under such conditions, 6-methyluracil is formed as a by-product. The compounds selected from those represented by Formulas VI and VII above can also be used in certain instances to stabilize photographic silver halide emulsions.

The following examples will serve to illustrate further the method of making the compounds represented by Formula I of my invention.

*Example 1.—1,2-bis(4-hydroxy-6-methyl-1,3,3a,7-tetrazainden-2-yl)-1,2-dihydroxyethane*

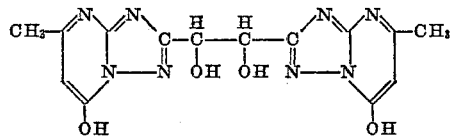

A mixture of 1 kg. of d-tartaric acid and 2 g. of n-butanol was refluxed, using a Dean-Stark Trap (J. A. C. S., vol. 63, page 3452) to remove the water. After 210–230 ml. of water had been removed, the residue was evaporated on the steam bath under a water-pump vacuum until relatively free of butanol. The warm ester was then poured portionwise with good stirring into 700 ml. of 64 percent of hydrazine, keeping the mixture cool with running water. The temperature rose to about 80° C. and stirring was discontinued when the mixture set to a paste. After standing overnight, the mixture was filtered, washed with 95 percent ethanol, and dried. The yield of tartaric hydrazide (white solid) was 1 kg., 85 percent of theory. It melted at 181–184° C.

In a 12 liter flask were placed 1.5 kg. of thiourea, 3 liters of 95 percent ethanol and 1.65 liters of bromoethane. The flask was equipped with a condenser surmounted by a Dry Ice-cooled condenser and heated gently on a steam bath until complete solution resulted. The mixture was then evaporated with steam under a water-pump vacuum to a thick syrup, which was transferred with cold water to a pot of 30–40 liters' capacity. A mixture of 2.8 kg. of ice and 2.5 liters of ethyl acetoacetate was then added. With good stirring, and addition of more ice as required to maintain the temperature below 25° C., a cool solution of 1.6 kg. of sodium hydroxide in 1.6 liters of water was added over a period of two hours. Sufficient ice was added at the completion of the addition to maintain the temperature below 25° C. After the cool mixture was allowed to stand overnight, more ice was added, and 1.8 liters of glacial acetic acid were added. When the mixture reached 15° C., it was filtered, sucked dry, washed well with cold water and dried. The yield of material was 2.3–2.5 kg., 70–75 percent of theory. The resulting 2-ethylmercapto-4-hydroxy-6-methylpyrimidine was crystallized from ethanol as a solid melting at 143–145° C.

A mixture of 500 g. of the tartaric hydrazide obtained above, 950 g. of the 2-ethylmercapto-4-hydroxy-6-methylpyrimidine obtained above, and 3 liters of water was heated on the steam bath (lightly stoppered or under a reflux condenser, since ethyl mercaptan is evolved copiously) for 20–30 hours. The reaction mixture was cooled to 20–25° C. and filtered. The resulting tartaric bis(4-hydroxy-6-methyl-2-pyrimidyl hydrazide) was dried and weighed 700–750 g. A sample of the desired product was extracted with hot water to yield a yellow solid melting at 281–285° C. with decomposition. The crude bis-hydrazide contained a small amount of 2-ethylmercapto-4-hydroxy-6-methylpyrimidine and 2-hydrazino-4-hydroxy-6-methylpyrimidine as impurities, although these materials caused no difficulty in the subsequent step.

The crude bis-hydrazide obtained above from the 550 g. of tartaric hydrazide, 2.8 liters of glacial acetic acid, and 140 ml. of concentrated hydrochloric acid were refluxed for 20 hours, cooled to 0° C. and the resulting mixture filtered. The filtrate was evaporated to dryness on a steam bath under a water-pump vacuum, and the residue was recrystallized from the smallest amount of water that would dissolve the bulk (90 percent) of residue. Traces of acetic acid were removed by boiling the solution, which was treated with decolorizing carbon and then filtered.

The desired 1,2-bis(4-hydroxy-6-methyl-1,3,3a,7-tetrazainden-2-yl)-1,2-dihydroxyethane separated in powdery form in a yield of about 100 g. (10 percent theory). It melted at 250–255° C. The insoluble residue remaining on the filter consisted primarily of 6-methyluracil.

*Example 2.—1,6-bis(4-hydroxy-6-methyl-1,3,3a,7-tetrazainden-2-yl)-2,5-dioxahexane*

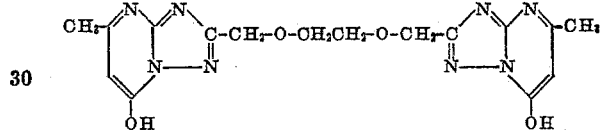

In exactly the manner described above, 3,6-dioxaoctanedioic hydrazide was prepared from the butyl ester by treatment with hydrazine. It was obtained as a solid melting at 128–130° C.

*Analysis.*—Calc'd. for $C_6H_{14}N_4O_4$: C, 34.9; H, 6.8; N, 27.2. Found: C, 35.0; H, 6.6; N, 27.4.

3,6-dioxaoctanedioic bis(4-hydroxy-6-methyl-2-pyrimidin-yl)hydrazide was prepared from the 3,6-dioxaoctanedioic hydrazide in precisely the manner shown in Example 1 above. It was obtained as a solid melting at 252–253° C. with decomposition after recrystallization from water.

*Analysis.*—Calc'd. for $C_{16}H_{22}N_8O_6$: C, 45.5; H, 5.2; N, 26.6. Found: C, 45.9; H, 5.1; N, 26.3.

The desired above-formulated product was produced by treatment of the preceding hydrazide with hydrochloric acid and acetic acid exactly as described in Example 1 above. It melted at 300–305° C. with decomposition.

*Analysis.*—Calc'd. for $C_{16}H_{18}N_8O_4$: C, 49.7; H, 4.7; N, 29.0. Found: C, 49.6; H, 4.8; N, 29.1.

*Example 3.—1,2-bis(4-hydroxy-6-methyl-1,3,3a,7-tetrazainden-2-yl)ethane*

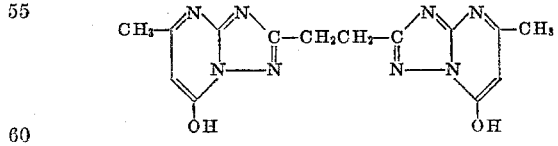

This compound was prepared in exactly the same way as the 1,2-hydroxyethane compound in Example 1, starting from the succinic acid ester instead of the tartaric acid ester. It was obtained in 3 percent yield as a solid melting at 240–242° C. with decomposition.

*Example 4.—1,4-bis(4-hydroxy-6-methyl-1,3,3a,7-tetrazainden-2-yl)butane*

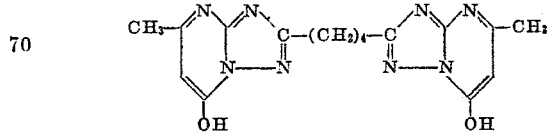

This compound was prepared in exactly the same manner as the 1,3-dihydroxy-2-ethane compound of Example 1 by replacing the tartaric acid ester of that example by the corresponding adipic acid ester. It was obtained as a solid melting at 218–220° C.

*Example 5.—1,2,3,4-tetrakis(4-hydroxy-6-methyl-1,3,3a,7-tetrazainden-2-yl)butane*

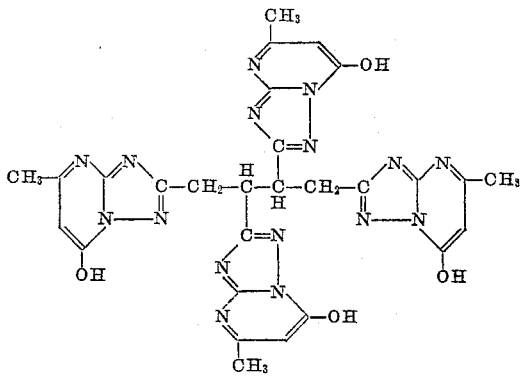

195 g. of 1,2,3,4 - tetrakis(carbohydrazido)butane (formed by reacting 1,2,3,4 - tetracarbomethoxybutane with hydrazine), 340 g. of 2-ethylmercapto-4-hydroxy-6-methylpyrimidine, 100 ml. of glacial acetic acid and 5 liters of water were refluxed for 24 hours, thoroughly cooled, and the reaction mixture filtered. The resulting crude 1,2,3,4-tetrakis(4-hydroxy-6 - methyl - 2 - pyrimidyl hydrazino)butane was refluxed with one liter of glacial acetic acid and 50 ml. of concentrated hydrochloric acid for 24 hours. The reaction mixture was cooled to 0° C. and filtered. The solid, recrystallized from water, yielded 39 g. of 6-methyluracil melting at 310–315° C. The combined mother liquors were evaporated and recrystallized from water yielding 18 g. of white solid melting at 263–265° C. On recrystallization from ethanol, the desired 1,2,3,4-tetrakis(4 - hydroxy - 6 - methyl - 1,3,3a,7-tetrazainden-2-yl)butane crystallized with two moles of water and two moles of ethanol.

*Analysis.*—Calc'd.: C, 49.9; H, 5.4; N, 28.1. Found: C, 50.1; H, 5.0; N, 28.8.

6-hydroxy-4-methyl-1,2,3a,7-tetrazaindene was prepared by treating 2-hydrazino-4-hydroxy - 6 - methylpyrimidine with formic acid at about 70° C. for one hour. It was obtained as a solid melting at 245–248° C. Upon heating this compound with glacial acetic acid and concentrated hydrochloric acid, it was converted into the 1,3,3a,7-isomer.

3,4-dimethyl-6-hydroxy-1,2,3a,7-tetrazaindene was prepared in a similar manner from glacial acetic acid and 2-hydrazino-4-hydroxy-6-methylpyrimidine. It was obtained as a white solid melting at 312–313° C. This compound was converted into the 1,3,3a,7-isomer by treatment with concentrated hydrochloric acid and glacial acetic acid.

In a similar manner, 6-hydroxy-3-(4-pyridyl)-4-methyl-1,2,3a,7-tetrazaindene was prepared from 2-hydrazino-4 - hydroxy - 6 - ethylpyrimidine and isonicotinyl chloride hydrochloride by refluxing in pyridine. It melted above 310° C. Treatment of this compound with concentrated hydrochloric acid in water produced the 1,3,3a,7-isomer.

In a similar manner, ω-hydroxybutyrohydrazide yielded 4 - hydroxy - 2 - γ - hydroxypropyl - 6 - methyl - 1,3,3a,7-tetrazaindene melting at 255–257° C. by treatment of the 1,2,3a,7-isomer with concentrated hydrochloric acid.

The compounds of my invention represented by Formula I above can also be prepared in a stepwise fashion from the 1,2,3a,7-isomers in the manner described above for the preparation of the compounds of Formula VI. Both isomers can advantageously be employed to stabilize photographic silver halide emulsions.

The principal purpose of my invention is to provide a means for maintaining the sensitivity and fog of silver halide emulsions at or close to initial optimum values under conditions of high temperature or high humidity, or both. Preferably, the antifoggants of my invention are added to the emulsion at any stage during the process of manufacture prior to coating the emulsion. The antifoggants can be added to the emulsion in solution in water or any convenient solvent not injurious to the emulsion, such as lower aliphatic alcohols, acetone, etc.

The solutions of antifoggants which I employ when added in suitable concentration before coating to unsensitized or optically sensitized silver halide emulsions usually do not appreciably affect the sensitivity and fog when measurements are made soon after coating. However, when sensitometric measurements are made after appreciable intervals of time under tropical or dry conditions of storage at elevated temperatures, the antifoggants do stabilize speed and maintain fog at a low level.

The preparation of silver halide emulsions involves three separate operations: (1) the emulsification and digestion or ripening of the silver halide, (2) the freeing of the emulsion from aqueous soluble salts usually by washing, (3) the second digestion or after-ripening to obtain increased sensitivity (Mees, The Theory of the Photographic Process, 1942, page 3). The fog inhibiting agents can be added at any stage, preferably after the final digestion.

The photographic emulsions which I use are of the developing-out type and best results have been obtained with gelatino-silver bromoiodide emulsions. However, emulsions of varying halide composition can be used. The emulsions can be chemically sensitized by any of the accepted procedures. The emulsions can be digested with naturally active gelatin, or sulfur compounds may be added such as those described in Sheppard U. S. Patent 1,574,944, and U. S. Patent 1,623,499, and Sheppard and Brigham U. S. Patent 2,410,689.

The emulsions can also be treated with salts of the noble metals such as ruthenium, rhodium, palladium, iridium and platinum, all of which belong to group VIII of the periodic table of elements and have an atomic weight greater than 100. Representative compounds are ammonium chloropalladate, potassium chloroplatinate and sodium chloropalladite, which are used for sensitizing in amounts below that which produces any substantial fog inhibition, as described in Smith and Trivelli U. S. Patent 2,448,060, and as antifoggants in higher amounts, as described in Trivelli and Smith U. S. Patents 2,566,245 and 2,566,263.

The emulsions can also be chemically sensitized with gold salts as described in Waller and Dodd U. S. Patent 2,399,083, or stabilized with gold salts as described in Damschroder U. S. Patent 2,597,856 and Yutzy and Leermakers U. S. Patent 2,597,915. Suitable compounds are potassium chloroaurite, potassium aurithiocyanate, potassium chloroaurate, auric trichloride and 2-aurosulfobenzothiazole methochloride.

The emulsions can also be chemically sensitized with reducing agents, such as stannous salts (Carroll U. S. Patent 2,487,850), polyamines such as diethylene triamine (Lowe and Allan U. S. Patent 2,521,925), or bis-(β-aminoethyl)sulfide and its water-soluble salts (Lowe and Jones U. S. Patent 2,521,926).

The emulsions can also be stabilized with the mercury compounds of Allen, Byers and Murray U. S. Patent 2,728,663, Carroll and Murray U. S. Patent 2,728,664 and Leubner and Murray U. S. Patent 2,728,665.

The antifoggants of my invention are effective in the presence or absence of optical sensitizing dyes. Since optical sensitizing can affect stability of emulsions with respect to sensitivity, fog and latent image changes, the action of the antifoggants is not completely independent of optical sensitizing or other emulsion variables. I have found, however, that both unsensitized emulsions and emulsions sensitized with cyanine or merocyanine dyes, or both, can be treated with the antifoggant compounds represented by Formula I above.

The quantity of antifoggant compound employed can be varied, depending upon the particular silver halide employed, degree of ripening, presence or absence of other emulsion addenda, etc. In general, the quantity of antifoggant can vary from about 0.01 to 5.0 grams per gram mole of silver halide in the emulsion. These amounts can be used in combination with one or more of the chemical sensitizing and stabilizing agents listed above.

The stabilizing action afforded by the compounds of Formula I of my invention was determined by incubation of the emulsions for a period of one week at 120° F. and at constant humidity. The speeds were measured in terms of 30/E where E is the exposure in meter candle seconds required to produce a density of 0.2 above fog. The antifoggants were added to a panchromatically-sensitized high speed silver bromiodide emulsion which had been chemically sensitized with a sulfur compound, such as described in Sheppard U. S. Patent 1,574,944, and a gold compound, such as potassium chloroaurate. The emulsions were then coated on a cellulose acetate support and the coatings exposed on an Eastman Ib Sensitometer and processed for five minutes in a developer having the following composition:

| | G. |
|---|---|
| N-methyl-p-aminophenol sulfate | 2.5 |
| Hydroquinone | 2.5 |
| Sodium sulfite (desiccated) | 30.0 |
| Sodium metaborate | 10.0 |
| Potassium bromide | 0.5 |

Water to make one liter.

The results of these tests for speed, gamma and fog, before and after incubation of each of the samples, the numbers given corresponding to those in the above examples, are listed in the following table.

What I claim as my invention and desire secured by Letters Patent of the United States is:

1. A photographic silver halide emulsion containing a compound selected from those represented by the following general formula:

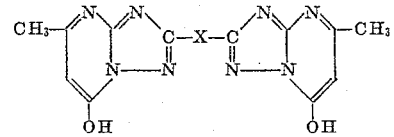

wherein X represents a divalent aliphatic organic group containing at least 2 carbon atoms.

2. A photographic silver bromiodide emulsion containing a compound selected from those represented by the following general formula:

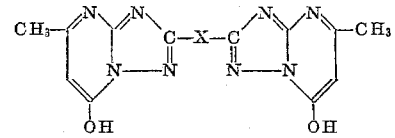

wherein X represents a divalent aliphatic organic group containing at least 2 carbon atoms.

3. A photographic gelatino-silver-halide emulsion containing a compound selected from those represented by the following general formula:

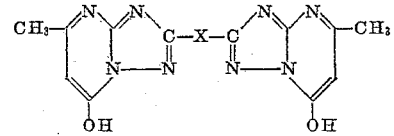

wherein X represents a divalent aliphatic organic group containing at least two carbon atoms.

| Compound of Example | Amount, g./mol. AgX | Speed | Gamma | Fog | Speed | Gamma | Fog | Coating Series |
|---|---|---|---|---|---|---|---|---|
| Control | | 11,400 | .85 | .13 | 8,650 | .62 | .23 | A |
| 1 | 1.5 | 12,200 | .82 | .13 | 12,500 | .73 | .13 | A |
| Control | | 6,400 | 1.35 | .17 | 3,450 | .90 | .30 | B |
| 2 | 0.3 | 4,450 | 1.16 | .17 | 3,700 | .89 | .14 | B |
| Control | | 6,400 | 1.16 | .13 | 5,200 | 1.24 | .22 | C |
| 4 | .09 | 5,200 | 1.09 | .12 | 5,200 | 1.35 | .17 | C |
| Control | | 5,450 | 1.22 | .14 | 2,800 | .88 | .54 | D |
| 5 | 3.0 | 5,200 | 1.17 | .14 | 6,250 | 1.07 | .14 | D |

It has also been found that the 3,6-dioxaoctanedioic bis(4-hydroxy-6-methyl-2-pyrimidyl)hydrazide obtained in Example 2 above has significant antifoggant properties.

In a manner similar to that illustrated in the above examples, other compounds of my invention can be used to stabilize photographic silver halide emulsions, either in the presence or absence of chemical sensitizers.

Instead of incorporating the antifoggants in the photographic silver halide emulsion, these antifoggants can be incorporated in a colloid layer, such as a gelatin overcoating layer or interlayer, in contact with the emulsion.

The fog-inhibiting agents which I have described can be used in various kinds of photographic emulsions. In addition to being useful in non-sensitized emulsions, they can also be used in orthochromatic, panchromatic, and X-ray emulsions. If used with sensitizing dyes they can be added to the emulsion before or after the dyes are added. Various silver halides can be used as the light-sensitive material, including silver bromide, silver iodide, silver chloride, silver bromiodide, silver chlorobromide, silver chlorobromiodide, etc. The antifoggants of my invention can be used in emulsions intended for color photography, for example, emulsions containing color-forming couplers, or emulsions to be developed by solutions containing couplers.

The dispersing agents can be gelatin, or other colloids, such as collodion, albumen, cellulose derivatives, synthetic resins, etc.

4. A photographic silver halide emulsion containing a compound selected from those represented by the following general formula:

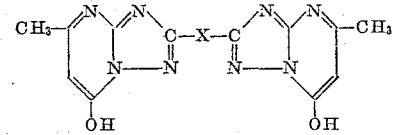

wherein X represents an alkylene group containing at least 2 carbon atoms.

5. A photographic silver halide emulsion containing the compound represented by the following formula:

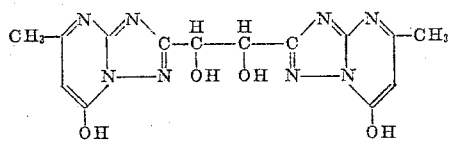

6. A photographic silver halide emulsion containing the compound represented by the following formula:

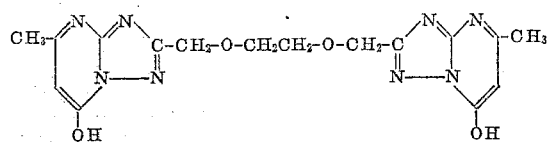

7. A photographic silver halide emulsion containing the compound represented by the following formula:

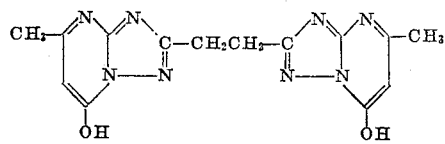

8. A photographic silver halide emulsion containing the compound represented by the following formula:

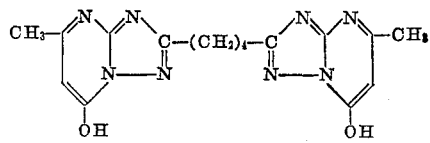

9. A photographic silver halide emulsion containing the compound represented by the following formula:

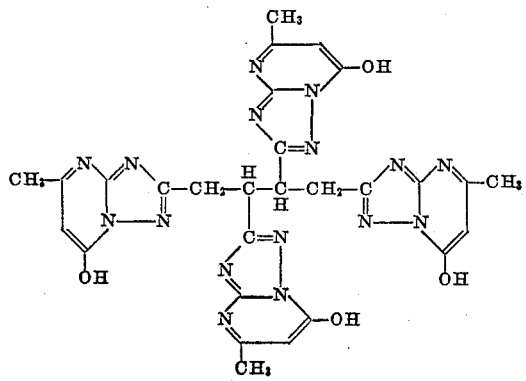

10. A light-sensitive photographic element comprising a silver halide emulsion layer and an organic colloid layer contiguous to said emulsion layer, at least one of said layers containing as a stabilizing agent for said emulsion a compound selected from those represented by the following general formula:

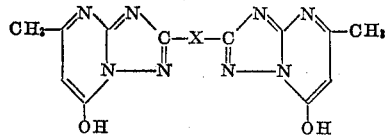

wherein X represents a divalent aliphatic organic group containing at least two carbon atoms.

11. A process for developing an exposed photographic silver halide emulsion comprising developing said exposed photographic silver halide emulsion in the presence of a compound selected from those represented by the following general formula:

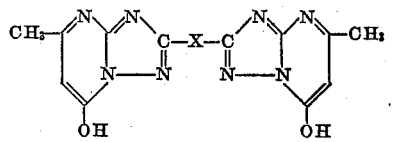

wherein X represents a divalent aliphatic organic group containing at least two carbon atoms.

References Cited in the file of this patent
UNITED STATES PATENTS

| | | |
|---|---|---|
| 2,688,619 | Mahan et al. | Sept. 7, 1954 |
| 2,691,655 | Hitchings et al. | Oct. 12, 1954 |
| 2,735,769 | Allen et al. | Feb. 21, 1956 |
| 2,743,180 | Carroll | Feb. 24, 1956 |